United States Patent
Wu (10) Patent No.: US 7,995,035 B2
(45) Date of Patent: Aug. 9, 2011

(54) MOUSE WITH ADJUSTABLE BUTTON ACTIVATING PRESSURE

(75) Inventor: Cheng-Cheng Wu, Sindian (TW)

(73) Assignee: Dexin Corporation, Taipei Hsien (TW)

( * ) Notice: Subject to any disclaimer, the term of this patent is extended or adjusted under 35 U.S.C. 154(b) by 404 days.

(21) Appl. No.: 12/318,558

(22) Filed: Dec. 31, 2008

(65) Prior Publication Data

US 2010/0164868 A1  Jul. 1, 2010

(51) Int. Cl.
*G06F 3/033* (2006.01)
*G09G 5/08* (2006.01)

(52) U.S. Cl. ........ 345/163; 345/157; 345/164; 345/165; 345/166; 345/168; 200/520

(58) Field of Classification Search .................. 345/163
See application file for complete search history.

(56) References Cited

U.S. PATENT DOCUMENTS

| | | | | |
|---|---|---|---|---|
| 4,313,113 A * | 1/1982 | Thornburg | ..................... | 345/159 |
| 5,790,102 A * | 8/1998 | Nassimi | ......................... | 345/163 |
| 5,898,424 A * | 4/1999 | Flannery | ........................ | 345/163 |
| 6,348,912 B1 * | 2/2002 | Smith | ............................. | 345/163 |
| 6,879,316 B2 * | 4/2005 | Kehlstadt et al. | ............. | 345/163 |
| 6,933,925 B1 * | 8/2005 | Gibbons et al. | ............... | 345/163 |
| 7,394,456 B2 * | 7/2008 | Kim et al. | ...................... | 345/168 |
| 7,705,827 B1 * | 4/2010 | Robinson | ....................... | 345/163 |
| 7,808,479 B1 * | 10/2010 | Hotelling et al. | ............. | 345/163 |
| 7,817,138 B2 * | 10/2010 | Chiang | ............................ | 345/163 |
| 2002/0084986 A1 * | 7/2002 | Armstrong | .................... | 345/163 |
| 2006/0250364 A1 * | 11/2006 | Gorbunov | ...................... | 345/163 |
| 2007/0211033 A1 * | 9/2007 | Farag et al. | .................... | 345/163 |
| 2007/0251810 A1 * | 11/2007 | Corcoran et al. | ............. | 200/507 |
| 2008/0198132 A1 * | 8/2008 | Nomura | ......................... | 345/163 |
| 2009/0009473 A1 * | 1/2009 | Ho | ................................ | 345/163 |
| 2009/0078547 A1 * | 3/2009 | Kurtz et al. | ................... | 200/81.4 |
| 2010/0127983 A1 * | 5/2010 | Irani et al. | ..................... | 345/163 |
| 2010/0201626 A1 * | 8/2010 | Krah et al. | ..................... | 345/163 |
| 2010/0245249 A1 * | 9/2010 | Ng | ................................. | 345/166 |
| 2010/0265179 A1 * | 10/2010 | Ram | .............................. | 345/163 |

FOREIGN PATENT DOCUMENTS

WO  WO 2008066521 A1 *  6/2008

* cited by examiner

*Primary Examiner* — Richard Hjerpe
*Assistant Examiner* — Christopher Thompson
(74) *Attorney, Agent, or Firm* — Rosenberg, Klein & Lee (57) ABSTRACT

A mouse with adjustable button activating pressure includes a body, two circuit boards, two switch sets and at least one adjusting means. The body is provided with two adjacent buttons. The two switch sets are provided in the body and electrically connected to the corresponding circuit board to correspond to the buttons of the body respectively. Each switch set includes a plurality of switches of different activating pressures. The adjusting means is adjustably assembled with the body and coupled to the switch set, thereby allowing the switch set to move with respect to the button of the body. Via the above arrangement of the present invention, the button activating pressure can be adjusted.

11 Claims, 8 Drawing Sheets

MOUSE WITH ADJUSTABLE BUTTON ACTIVATING PRESSURE

BACKGROUND OF THE INVENTION

1. Field of the Invention

The present invention relates to a mouse, and in particular to a mouse with adjustable button activating pressure.

2. Description of Related Art

With the coming of Information Era, a mouse or keyboard is one of the most important input devices necessary for using a computer. The mouse is used to operate a cursor and select a desired item on a screen of the computer.

The common mouse available in the market includes a base, a circuit board provided in the base, an upper casing assembled with the base, and switches electrically provided on the circuit board. Left and right buttons are provided in the fore part of the upper casing to correspond to the switches on the circuit board. When the user presses the left button or the right button, the corresponding switch can be pressed so as to activate the corresponding operation and in turn generate a desired action.

However, with regard to the above-mentioned common mouse, no matter the two-button mouse or the earlier three-button mouse, the button activating pressure has already determined in the manufacturing factory, so that the user cannot adjust the button activating pressure based on his/her demands. Therefore, such a mouse is still insufficient for the user in playing multi-media applications or game software.

Consequently, because of the above limitation resulting from the technical design of prior art, the inventor strives via real world experience and academic research to develop the present invention, which can effectively improve the limitations described above.

SUMMARY OF THE INVENTION

The object of the present invention is to provide a mouse with adjustable button activating pressure, whereby the user can adjust his/her button activating pressure.

In order to achieve the above objects, the present invention provides a mouse with adjustable button activating pressure, which includes a body formed with an accommodating space therein, the body being provided with two adjacent buttons; two circuit boards provided in the accommodating space of the body; two switch sets provided in the accommodating space of the body and electrically connected to the corresponding circuit board to correspond to the buttons of the body respectively, each switch set comprising a plurality of switches of different activating pressures; and at least one adjusting means adjustably assembled with the body and coupled to the switch set, thereby allowing the switch set to move with respect to the button of the body.

The present invention has advantageous features as follows. With the switches of different activating pressures being assembled with the switch set and the cooperation of the adjusting means, the user can adjust his/her button activating pressure when pressing the buttons of the mouse. In comparison with prior art, the present invention allows the user to enjoy the multi-media software more freely.

In order to further understand the characteristics and technical contents of the present invention, a detailed description relating thereto will be made with reference to the accompanying drawings. However, the drawings are illustrative only, but not used to limit the scope of the present invention.

DETAILED DESCRIPTION OF PREFERRED EMBODIMENTS

Figure 1:
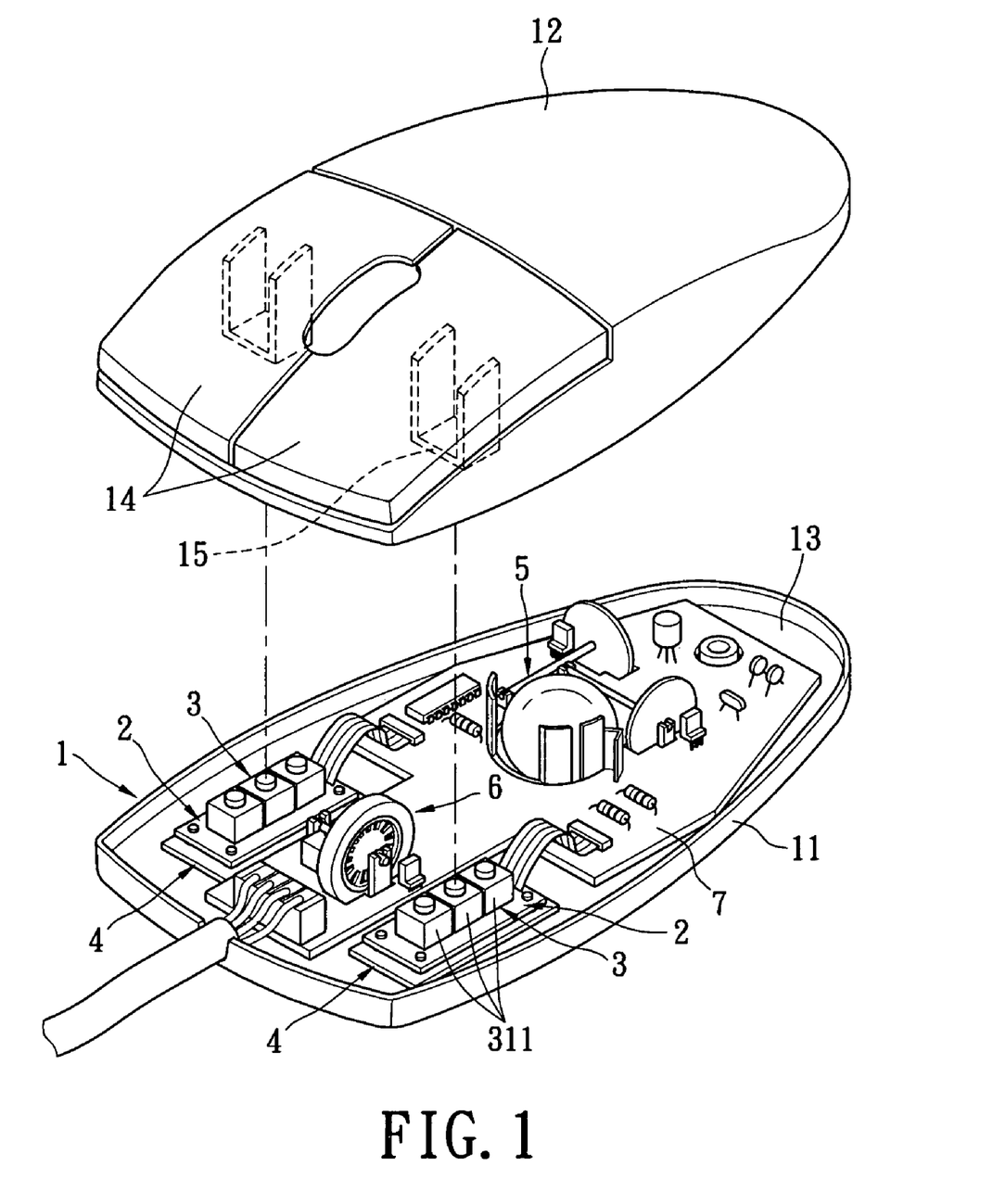
FIG. 1 is an exploded perspective view of the present invention.
Figure 2:
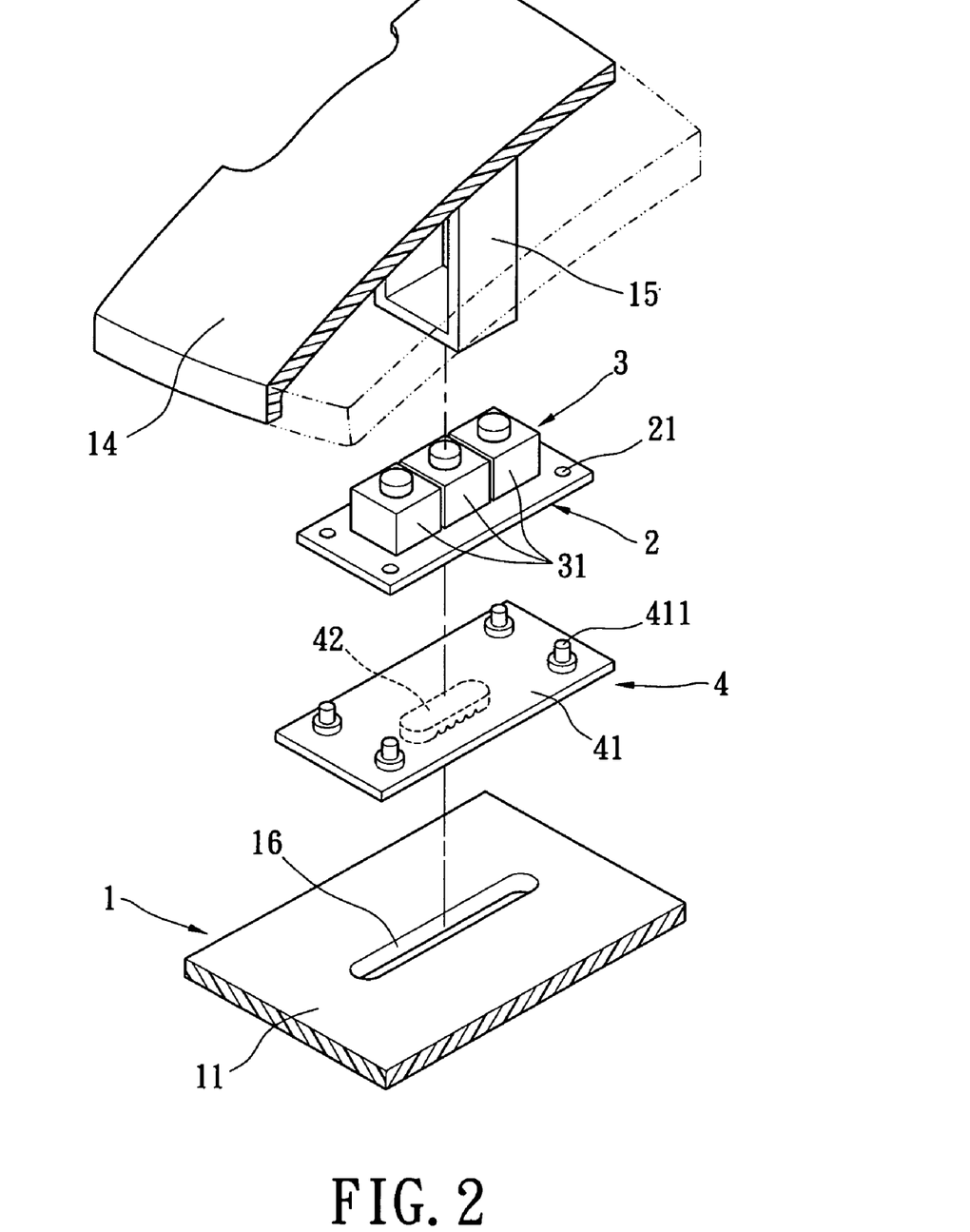
FIG. 2 is a partially exploded perspective view of the first embodiment of the present invention with a large portion of the body removed.
Figure 3:
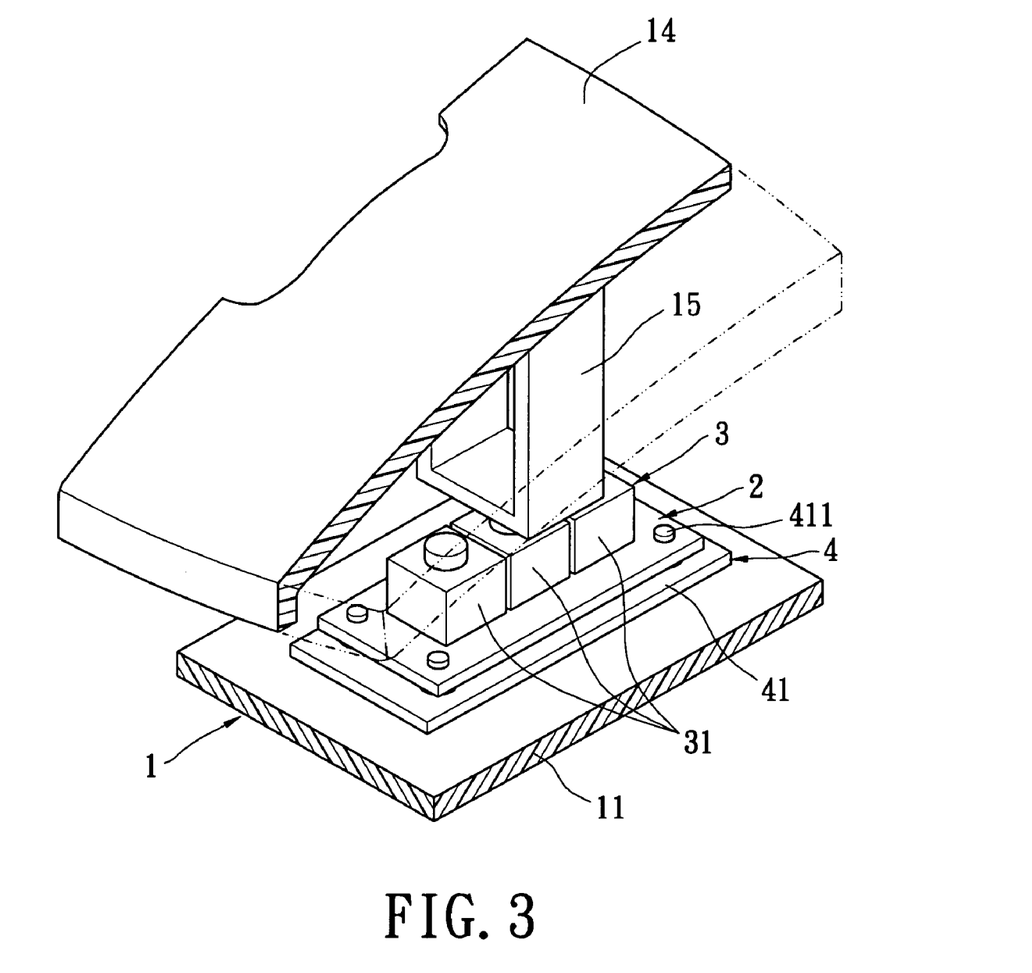
FIG. 3 is a partially assembled perspective view of the first embodiment of the present invention with a large portion of the body removed.

Please refer to FIGS. 1 to 3. The present invention provides a mouse with adjustable button activating pressure, which includes a body 1, two circuit boards 2, two switch sets 3, at least one adjusting means 4, a cursor control unit 5, a roller control unit 6 and a main board 7.

The body 1 has a base 11 and a cover 12 assembled with the base 11. The interior spaces of the base 11 and the cover 12 together form an accommodating space 13. The fore part of the cover 12 of the body 1 is provided with two adjacent buttons 14. The cover 12 may be integrally formed with two buttons 14. The distal ends of the two buttons 14 can be connected to each other to form one body. The two buttons 14 may be separate members and separated from the cover 12. In the present invention, the buttons 14 are not limited to a specific form. An inner surface of each of the buttons 14 extends downwards to form an arm 15 that is formed into a U-shape and extends into the accommodating space 13. The bottom of the body 1 is provided with two adjacent troughs 16 that are also provided on the bottom of the base 11.

The circuit board 2 and the main board 7 are disposed in the accommodating space 13 of the body 1 and are positioned on the base 11. The circuit bard 2 is electrically connected to the main board 7.

The cursor control unit 5 and the roller control unit 6 are provided on the body 1 and are electrically connected to the main board 7. The cursor control unit 5 may be a mechanical or optical control unit. In the drawing, a mechanical control unit is shown as an example. Similarly, the roller control unit 6 may be a mechanical or optical code control unit, and the mouse may be a cabled or wireless mouse. In the present invention, the above members are not limited to the specific ones. Since the cursor control unit 5 and the roller control unit 6 of the mouse are well known for those skilled in this art and these two units are not the subject matters of the claims of the present invention, the description thereof is omitted for simplicity.

The switch sets 3 are provided in the body 1 at an interval and are electrically connected with the circuit board 2 to correspond to the buttons 14 of the body 1. Each switch set 3 comprises a plurality of switches 31 of different activating pressures. The number of the switches 31 may be two, three or four. In the drawing, there are three mechanical switches. In the first embodiment, all the switches 31 of the two switch sets 3 can be electrically connected to and arranged in a line on the corresponding surface of the circuit board 2.

The adjusting means 4 is adjustably assembled with the body 1 and coupled to the switch set 3, so that the switch set 3 is movable with respect to the button 14 of the body 1 in such a way that one of the switches 31 corresponds to the arm 15 of the button 14. Since each switch 31 has different activating pressure, the user can generate different feelings of pressing a button 14 by means of making the button 14 to contact different switches 31. The present invention is provided with an adjusting means 4 that can drive two switch sets 3 simultaneously. Alternatively, two adjusting means 4 can be provided to drive two switch sets 3 respectively. In the present invention, two adjusting means 4 are illustrated, each of which comprises a support 41 and a push button 42 connected to the support 41 for pushing the support 41 to move. The push button 42 can be formed by means of protruding downwards from the bottom surface of the support 41, or it can be formed as a separate member that is to be assembled with the support 41.

In the present embodiment, the support 41 is provided in the accommodating space 13 of the body 1 and is movably disposed below the corresponding circuit board 2, thereby driving the circuit board 2 to move. The push button 42 is accommodated in a trough 16 of the body 1 for pushing the support 41 to move. The support 41 is provided with a plurality of posts 411. The circuit board 2 is provided with a plurality of through-holes 21 for allowing the corresponding posts 411 to be inserted therein respectively. With the connection between the posts 411 and the through-holes 21 respectively, the support 41 can drive the circuit board 2 to move.

Figure 4:
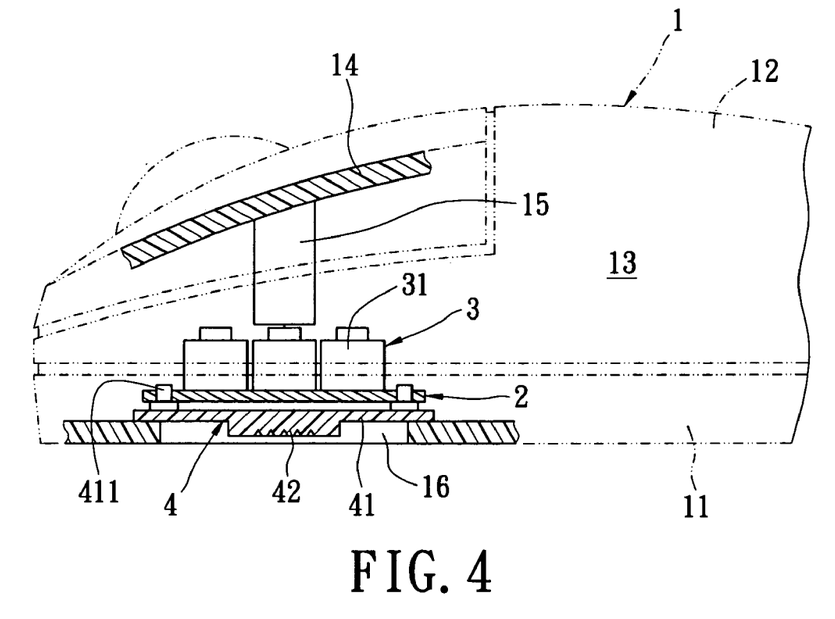
FIG. 4 is a schematic view (I) showing the operating state of the first embodiment of the present invention.
Figure 5:
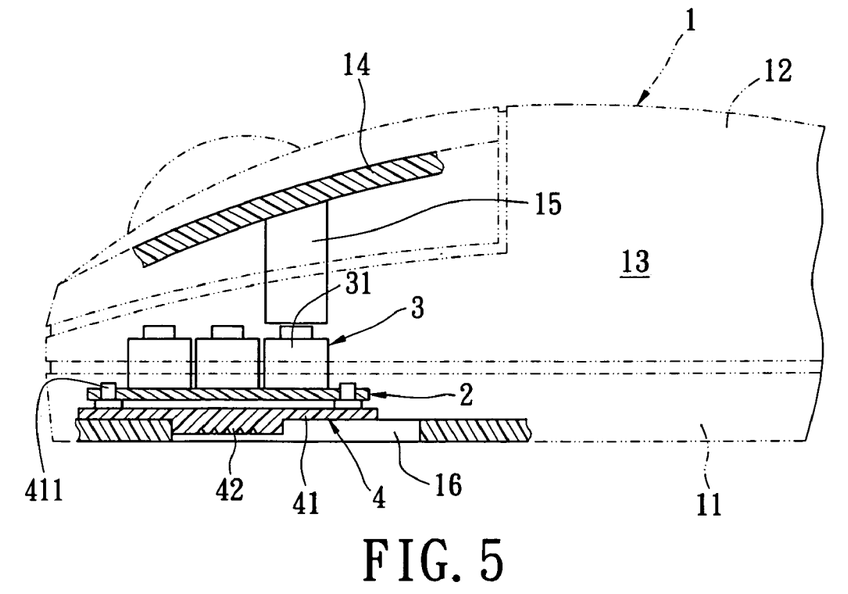
FIG. 5 is a schematic view (II) showing the operating state of the first embodiment of the present invention.

According to the above, please refer to FIGS. 4 and 5. The user pushes the push button 42 of the adjusting means 4 with his/her finger, so that the support 41 can drive the circuit board 2 and the switches 31 to move. In this way, one of the switches 31 of different activating pressures can be adjusted to correspond to the arm 15 of the button 14, thereby adjusting the button activating pressure 14.

Figure 6:
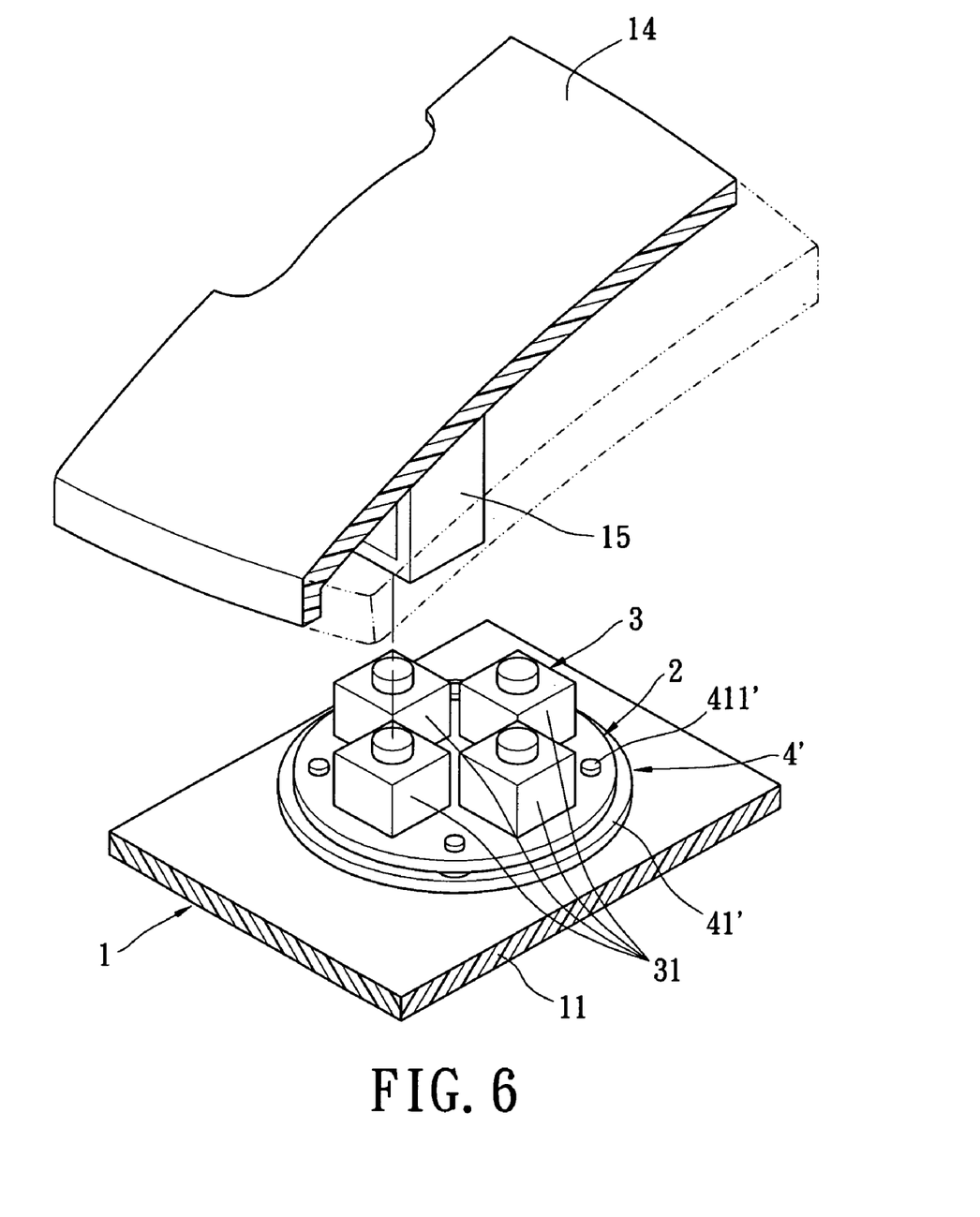
FIG. 6 is a partially assembled perspective view of the second embodiment of the present invention with a large portion of the body removed.
Figure 7:
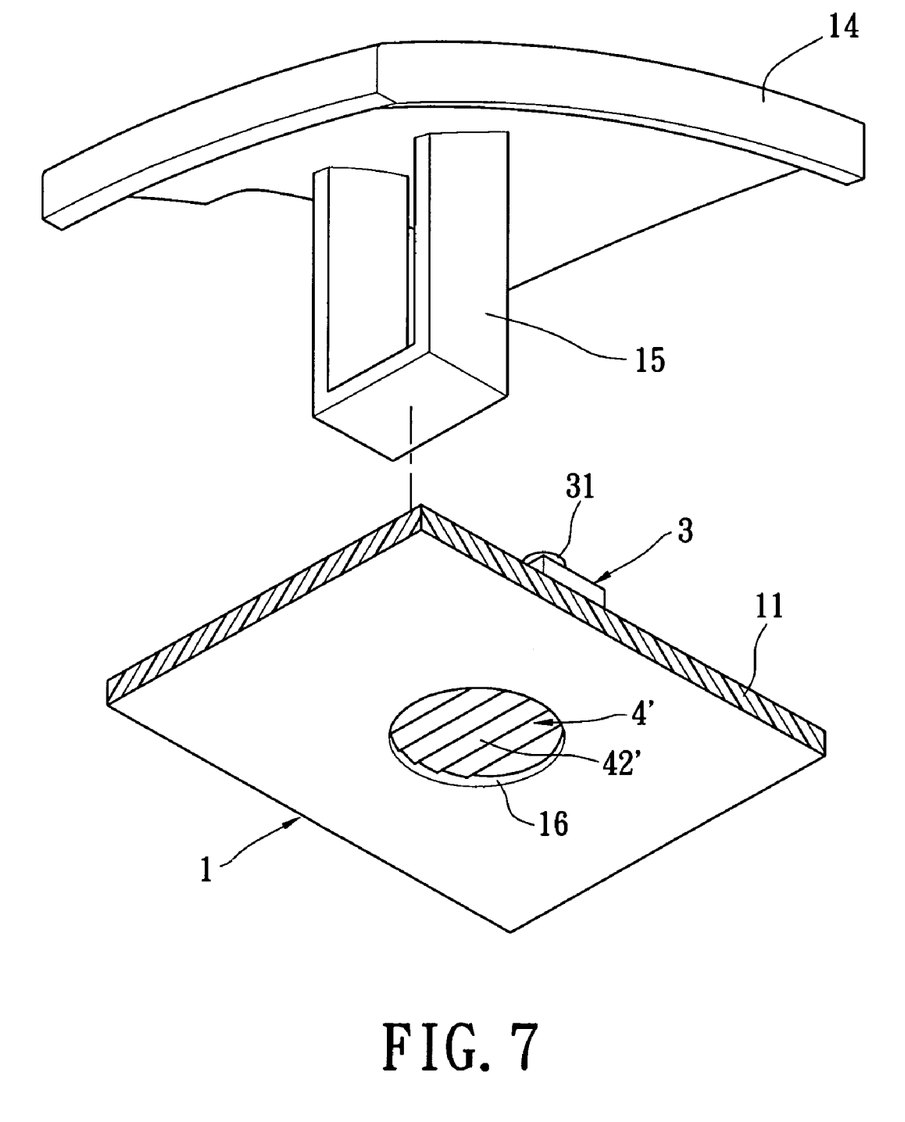
FIG. 7 is a partially assembled perspective view of the second embodiment of the present invention from another viewing angle with a large portion of the body removed.

Please refer to FIGS. 6 and 7, which show the second embodiment of the present invention. The difference between the second embodiment and the first embodiment lies in that: the switches 31 of each switch set 3 are arranged on the corresponding circuit board 2 like a ring, or they can be arranged on the circuit board 2 at three or four points. Further, the adjusting means 4' has a support 41' and a knob 42' connected to the support 41' for rotating the support 41'. Similarly, the support 41' is also formed with posts 411' and the circuit board 2 is provided with through-holes 21. The support 41' can drive the circuit board 2 to rotate. With the knob 42' being received in the trough 16 of the body 1, the support 41' can be driven to rotate. Therefore, the user can rotate the knob 42' of the adjusting means 4' with his/her finger, thereby driving the circuit board 2 and the switches 31 to rotate. In this way, one of the switches 31 can be adjusted to correspond to the arm 15 of the button 14.

Figure 8:
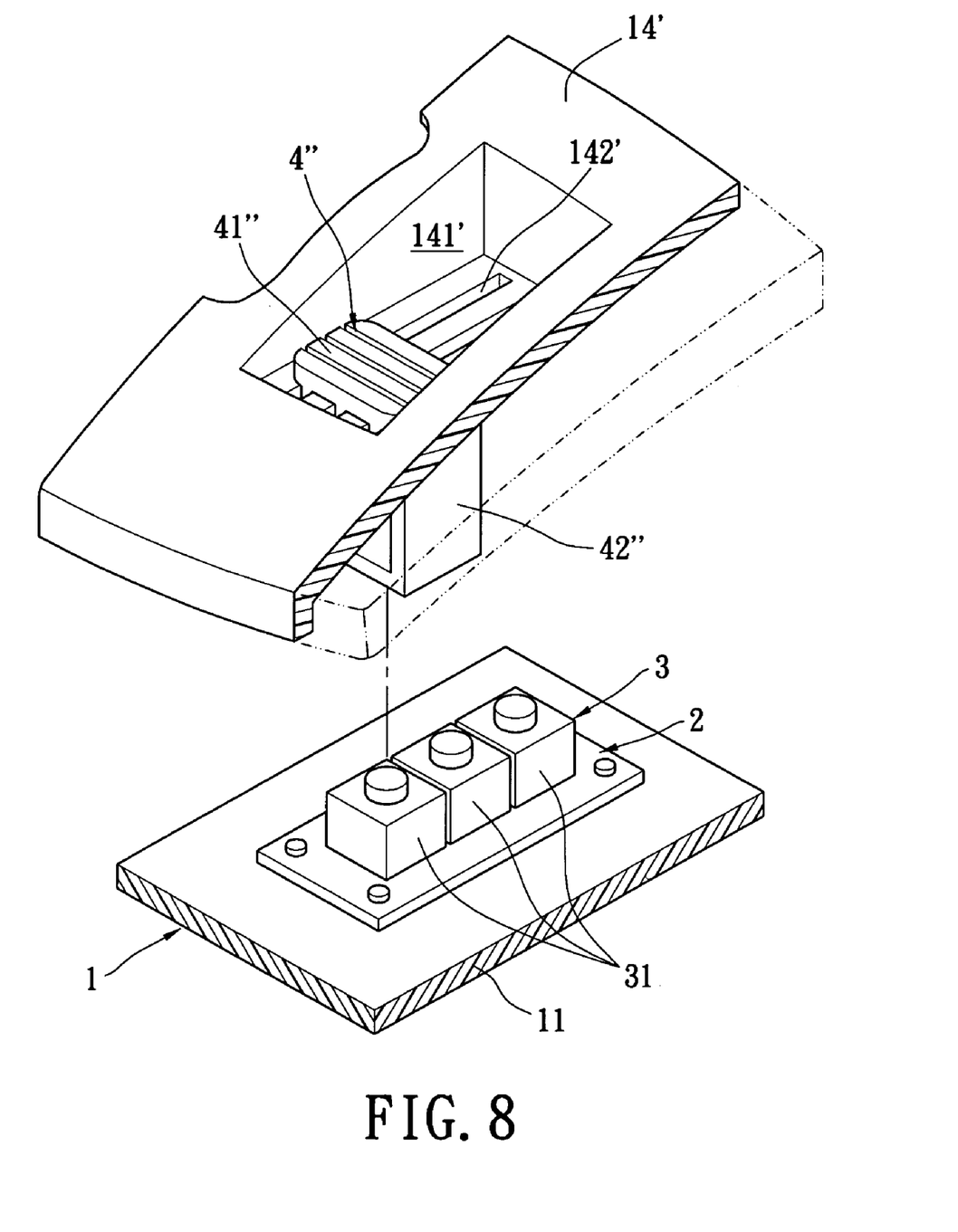
FIG. 8 is a partially assembled perspective view of the third embodiment of the present invention with a large portion of the body removed.

Please refer to FIG. 8, which shows the third embodiment of the present invention. As shown in this figure, the adjusting means 4" can be further varied and designed. Two adjusting means 4" are provided (only one is shown for illustration) and adjustably disposed on the two buttons 14' of the body 1 respectively. The adjusting means 4" is movable with respect to the switch set 3. Further, the switches 31 are arranged in a line on the circuit board 2. The circuit board 2 may be the above-mentioned main board, or it can be a separate circuit board. That is, it can be designed in such a way that there is one circuit board or three circuit boards (i.e. two circuit boards and a main board), which is not limited to any specific one in the present invention. This figure shows separate circuit boards 2 being fixed on the base 11 of the body 1.

In the present embodiment, each button 14' is formed with a recess 141'. The bottom wall forming the recess 141' is provided with grooves 142'. The adjusting means 4 of the present embodiment has a push button 41" and an arm 42" connected below the push button 41". The push button 41 is accommodated in the corresponding recess 141'. The arm 42" passes through the grooves 142' and extends into the accommodating space of the body 1 to correspond to one of the switches 31 of the switch set 3. With the arm 42" passing through the grooves 142', the push button 41 can be movably accommodated in the recess 141'.

Therefore, in the present embodiment, the user extends his/her finger or other suitable tool into the recess 141 to push the push button 41 along the groove 142', thereby driving the arm 42" to move to correspond to one of the switches 31. In this way, the feeling in pressing buttons 14' can be adjusted.

Figure 9:
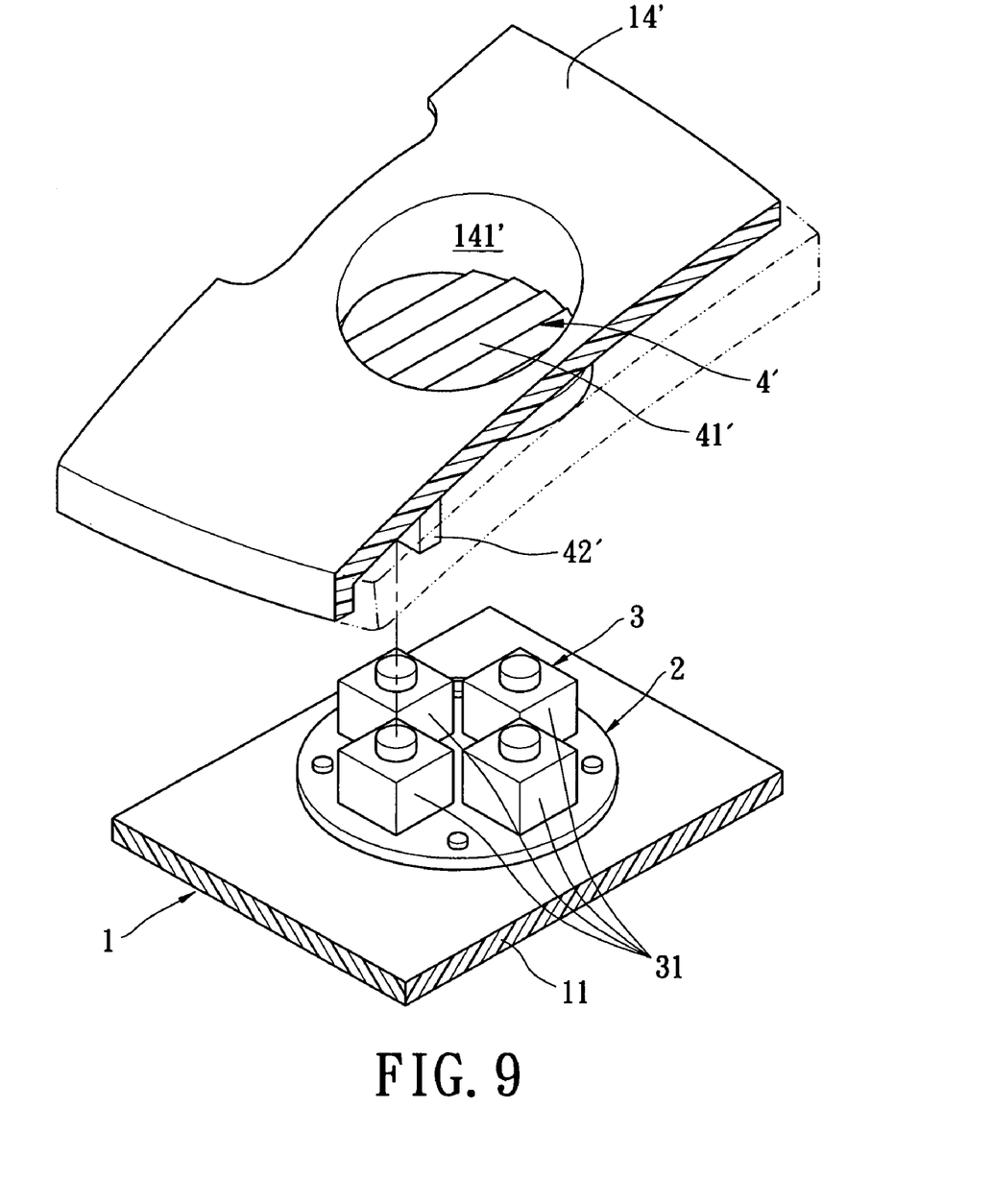
FIG. 9 is a partially assembled perspective view of the fourth embodiment of the present invention with a large portion of the body removed.

Please refer to FIG. 9, which shows the fourth embodiment of the present invention. The difference between the fourth embodiment and the second embodiment lies in that: each adjusting means 4' has a knob 41' and an arm 42' connected below the knob 41'. The switches 31 are arranged on the circuit board 2 like a ring. The knob 41' is rotatably received in the corresponding recess 141'. The arm 42' extends into the accommodating space of the body 1 to correspond to one of the switches 31 of the switch set 3.

Therefore, in the present embodiment, the user can rotate the knob 41' to drive the arm 42' to rotate, thereby corresponding to one of the switches 31. In this way, the button activating pressure 14' can be adjusted.

According to the above, in the present invention, with the switches of different activating pressures being assembled with the switch set and the cooperation of the adjusting means, the user can adjust his/her button activating pressure when pressing the buttons of the mouse. In comparison with prior art, the present invention allows the user to enjoy the multi-media software more freely.

While the present invention has been described in terms of what is presently considered to be the most practical and preferred embodiments, it is to be understood that the present invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mouse with adjustable button activating pressure, comprising:
   a body formed with an accommodating space therein, the body being provided with two adjacent buttons;
   two circuit boards provided in the accommodating space of the body;
   two switch sets provided in the accommodating space of the body and electrically connected to the corresponding circuit board to correspond to the buttons of the body respectively, each switch set comprising a plurality of switches of different activating pressures; and
   at least one adjusting means adjustably assembled with the body and coupled to the switch set, thereby allowing the switch set to move with respect to the button of the body.

2. The mouse with adjustable button activating pressure according to claim 1, wherein two adjusting means are provided, the two adjusting means are coupled to the two switch sets respectively, the switches of each switch set are electrically connected on the surface of the corresponding circuit board.

3. The mouse with adjustable button activating pressure according to claim 2, wherein each of the two adjusting means comprises a support and a push button connected to the support for pushing the support to move, the support is disposed in the accommodating space of the body and movably disposed below the corresponding circuit board to drive the circuit board to move, the bottom of the body is provided with a trough for accommodating the push button, the switches of each switch set are arranged in a line on the corresponding circuit board.

4. The mouse with adjustable button activating pressure according to claim 2, wherein each of the two adjusting means comprises a support and a knob connected to the support for rotating the support, the support is disposed in the accommodating space of the body and rotatably disposed below the corresponding circuit board to drive the circuit board to move, the bottom of the body is provided with a trough for accommodating the knob, the switches of each switch set are arranged on the corresponding circuit board like a ring.

5. The mouse with adjustable button activating pressure according to claim 1, wherein the inner surface of the button of the body is provided with an arm extending into the accommodating space, and one of the switches of the switch set corresponds to the arm.

6. The mouse with adjustable button activating pressure according to claim 1, wherein each switch of the switch set is a mechanical switch.

7. A mouse with adjustable button activating pressure, comprising:

a body formed with an accommodating space therein, the body being provided with two adjacent buttons;

a circuit board provided in the accommodating space of the body;

two switch sets provided in the accommodating space of the body and electrically connected to the corresponding circuit board to correspond to the buttons of the body respectively, each switch set comprising a plurality of switches of different activating pressures; and     two adjusting means adjustably assembled with the body and movable with respect to the two switch sets.

8. The mouse with adjustable button activating pressure according to claim 7, wherein the button of the body is formed with a recess, the bottom wall forming the recess is provided with grooves, each of the adjusting means has a knob movably accommodated in the recess of the corresponding button and an arm connected below the push button and passing through the grooves to extend into the accommodating space of the body, the arm corresponds to one of the switches of the switch set.

9. The mouse with adjustable button activating pressure according to claim 8, wherein the switches of each switch set are electrically connected to the circuit board and arranged in a line on the surface of the circuit board.

10. The mouse with adjustable button activating pressure according to claim 7, wherein the button of the body is formed with a recess, each of the adjusting means has a knob movably accommodated in the recess of the corresponding button and an arm connected below the push button to extend into the accommodating space of the body, the arm corresponds to one of the switches of the switch set.

11. The mouse with adjustable button activating pressure according to claim 7, wherein each switch of the switch set is a mechanical switch.

\* \* \* \* \*